(12) United States Patent
Tschida

(10) Patent No.: US 11,563,880 B2
(45) Date of Patent: Jan. 24, 2023

(54) REMOTE CONTROL FOR CAMERAS

(71) Applicant: CMOTION GMBH, Vienna (AT)

(72) Inventor: Christian Tschida, Vienna (AT)

(73) Assignee: CMOTION GMBH, Osterreich (AT)

( * ) Notice: Subject to any disclaimer, the term of this patent is extended or adjusted under 35 U.S.C. 154(b) by 272 days.

(21) Appl. No.: 16/645,226

(22) PCT Filed: Sep. 14, 2018

(86) PCT No.: PCT/AT2018/060211
§ 371 (c)(1),
(2) Date: Mar. 6, 2020

(87) PCT Pub. No.: WO2019/051523
PCT Pub. Date: Mar. 21, 2019

(65) Prior Publication Data
US 2020/0296277 A1 Sep. 17, 2020

(30) Foreign Application Priority Data
Sep. 14, 2017 (AT) ............... A 50769/2017

(51) Int. Cl.
*H04N 5/232* (2006.01)
*G05G 1/01* (2008.04)
*G05G 1/08* (2006.01)

(52) U.S. Cl.
CPC ........... *H04N 5/23206* (2013.01); *G05G 1/01* (2013.01); *G05G 1/08* (2013.01)

(58) Field of Classification Search
CPC ......... H04N 5/23206; G05G 1/01; G05G 1/08
See application file for complete search history.

(56) References Cited

U.S. PATENT DOCUMENTS

| 4,795,118 A * | 1/1989 | Kosugi | F16M 11/14 |
| | | | 403/138 |
| 6,161,933 A | 12/2000 | Tschida et al. | |
| 2003/0025802 A1 | 2/2003 | Mayer et al. | |
| 2007/0166027 A1* | 7/2007 | Misawa | H04N 5/23209 |
| | | | 396/529 |
| 2008/0003993 A1* | 1/2008 | Rye | G08C 17/00 |
| | | | 455/418 |
| 2018/0046062 A1* | 2/2018 | Fisher | G08C 17/02 |

FOREIGN PATENT DOCUMENTS

EP 0574105 12/1993

* cited by examiner

*Primary Examiner* — Noam Reisner
(74) *Attorney, Agent, or Firm* — Workman Nydegger

(57) ABSTRACT

A remote control for cameras, having a grab handle unit that may be received in a first hand by a user along a handle axis and a first operating element operable using a second hand of the user and rotatable about a first axis of rotation, wherein the first axis of rotation is substantially perpendicular to a principal axis of the remote control and spans a principal plane with the principal axis, wherein the handle axis is rotated out of the principal axis within the principal plane, whereby an angle between handle axis and the first axis of rotation is higher than 90 angular degrees, wherein the remote control has an operating body with additional display means and/or operational elements within the area that is present due to the rotation of the handle axis thereout.

12 Claims, 3 Drawing Sheets

REMOTE CONTROL FOR CAMERAS

The invention relates to a remote control for cameras, having a grab handle unit that may be received in a first hand by a user along a handle axis and a first operating element operable using a second hand of the user and rotatable about a first axis of rotation, wherein the first axis of rotation is substantially perpendicular to a principal axis of the remote control and spans a principal plane with the principal axis.

In the film industry, certain exceptional circumstances cannot be controlled using a camera, in particular a professional film camera, without remote control for the camera. This is, for example, the case if the camera is attached at a vehicle or at a mechanic extension arm having a counterweight, a so-called "jib arm", or in exceptional circumstances that require especially rapid adjustment to changing conditions, for example, recordings of action and documentation shoots. With such remote controls it is in particular important that these are compact and handy and that these have, in spite of their compactness, sufficient display and operation possibilities that may be read and/or operated quickly and intuitively.

From prior art there has been known a remote control for cameras according to FIG. 1. The remote control may be held by a user at a grab handle unit, which is located to the left in FIG. 1, using one hand and may be operated using a second hand at an operating element, which is located to the right in FIG. 1. By rotating the operating element, there may controlled, for example, the scales (focal point, iris, zoom) of an objective of a camera. This known remote control has the disadvantage that the number of the present operating elements to be intuitively operated is insufficient and is not arranged in an ergonomic way. Any additional operating elements of a mounting module may be mounted, for example, at a distal front area of the grab handle unit, these operating elements, however, being then poorly accessible, the contact between the grab handle unit and the mounting module being prone to failures and subject to wear, and the remote control in overall being less compact and handy. Furthermore, with some of the known remote controls there is the disadvantage that a display for the display of information is located on a lateral surface of the grab handle unit, which is why a user has to rotate the grab handle unit for every single reading process, as in an operational position, only the top surface of the grab handle unit will usually be located within a direct range of vision of the user.

It is a task of the present invention to at least reduce the disadvantages of the known remote controls for cameras.

The present invention solves this task by the handle axis being rotated out of the principal axis in the principal plane, whereby an angle between handle axis and the first axis of rotation is higher than 90 angular degrees, wherein the remote control has an operating body with additional display means and/or operational elements within the area that is present due to the rotation of the handle axis thereout.

Due to the novel configuration and the respective novel technical construction of the remote control according to the invention, the area of the surface of the remote control, into which additional display means and/or operation elements may be introduced, which may be read and/or operated rapidly and intuitively by the user, is advantageously increased. Hereby, however, the remote control neither unduly loses compactness or handiness nor has it any contacts prone to failure. Furthermore, the ergonomics of the remote control according to the invention is advantageously improved as the obtuse angle, this is an angle of more than 90 angular degrees, between handle axis and first axis of rotation provides for a more natural posture of the user when holding and/or operating the remote control in the operational position intended therefor.

In a useful embodiment the operating body has a first portion and a second portion, wherein in the operational position of the remote control the first portion is located distal and the second portion is located proximal to the user. In this way, the operating body may be optimized in regard to a possibly intuitive and rapid operability.

In an advantageous embodiment the first portion of the operating body has a trapezoid cross-section in parallel to the principal plane and the second portion of the operating body has an at least partly semi-circular cross-section in parallel to the principal plane. The surface of the operating body is thus being optimized in regard to accessibility and intuitive operability of the operating elements, maintaining a possibly good compactness.

The first portion of the operating body usefully has on a top surface a second operating element, preferably with mechanic and/or electronic pressure elements for a thumb of the first hand of the user. The second operating element may thus be operated especially rapidly and intuitively.

The second portion of the operating body especially usefully has on the top surface a third operating element, preferably with mechanic and/or electronic pressure elements for a thumb of the second hand of the user. The third operating element may thus be operated especially rapidly and intuitively.

In an advantageous embodiment the second portion of the operating body has a round display. The available surface of the operating body is thus well utilized, and the display may be read and/or operated rapidly and intuitively.

In an especially advantageous embodiment the third operating element is arranged at least in some portions along the periphery of the display. The available surface of the operating body is thus especially well utilized.

In an advantageous embodiment the second portion of the operating body has, along its semi-circular peripheral surface, a fourth operating element rotatable about a second rotation axis, preferably for operating using the thumb of the second hand of the user, wherein the second axis of rotation is substantially perpendicular to the principal plane. The number of the additional operating elements, which may be operated rapidly and intuitively by the user, is further increased, maintaining the compactness and handiness of the remote control according to the invention.

In a further advantageous embodiment the grab handle unit has in an upper distal area a fifth operating element, in particular a joystick for the operation using the thumb of the first hand of the user. The number of the additional operating elements, which may be rapidly and intuitively operated by the user, is thus further increased, maintaining the compactness and handiness of the remote control according to the invention.

In a further advantageous embodiment the first operating element is configured as a rotary knob having an activatable and deactivatable rotation angle restriction. In a first operational mode, in which the rotation angle restriction is activated, the rotary knob may be rotated in both rotational directions about a particular angle smaller than 360 angular degrees. In a second operational mode, in which the rotation angle restriction is deactivated, the rotary knob may be rotated in both rotational directions for any period of time about an angle, which may also be higher than 360 angular degrees.

The remote control usefully has a battery and a capacitor for the energy supply, wherein the capacitor is configured to ensure for a determined period of time, in particular during the replacement of the battery, a sufficient energy supply of the remote control. In this way, there may advantageously be replaced an empty battery without the remote control having to be switched off and/or inadvertently interrupting the energy supply.

Furthermore, the invention relates to a system for the remote control of a function or of an element, in particular an objective, of a film camera of the system, wherein the system has an inventive remote control according to the preceding paragraphs, which is configured, by means of an operating element, to control the function or the element of the film camera.

In an advantageous embodiment the system has an interface for the communication between remote control and film camera, wherein the interface is preferably attached at the film camera, wherein the remote control is configured for the wireless communication with the interface.

Basically, unless otherwise indicated or claimed, the remote control is to be considered as independent from a camera or film camera. The remote control may be used or provided for the control of any commercially available film camera or camera, for example, a photo camera or the camera of a smartphone, or in a system having such a camera.

The mode of operation of a film camera or camera using a remote control has been known to those skilled in the art. Basically and exemplarily, by means of the operation/position of an operating element, for example, the first operating element, using an evaluation and control device, for example, a data processing unit of the remote control, there is generated one or several control signals, which are transmitted via an output device, for example, an antenna for the wireless data transmission or via an infrared or Bluetooth interface of the remote control, to the camera. The camera in turn receives the control signal/s by means of a receiver device, processing these by means of an evaluation and control device of the camera, for example, a data processing unit.

In the following, the invention is described in greater detail by way of a not-limiting embodiment example and a not-limiting application example in reference to the drawings. In the drawings.

Figure 6:
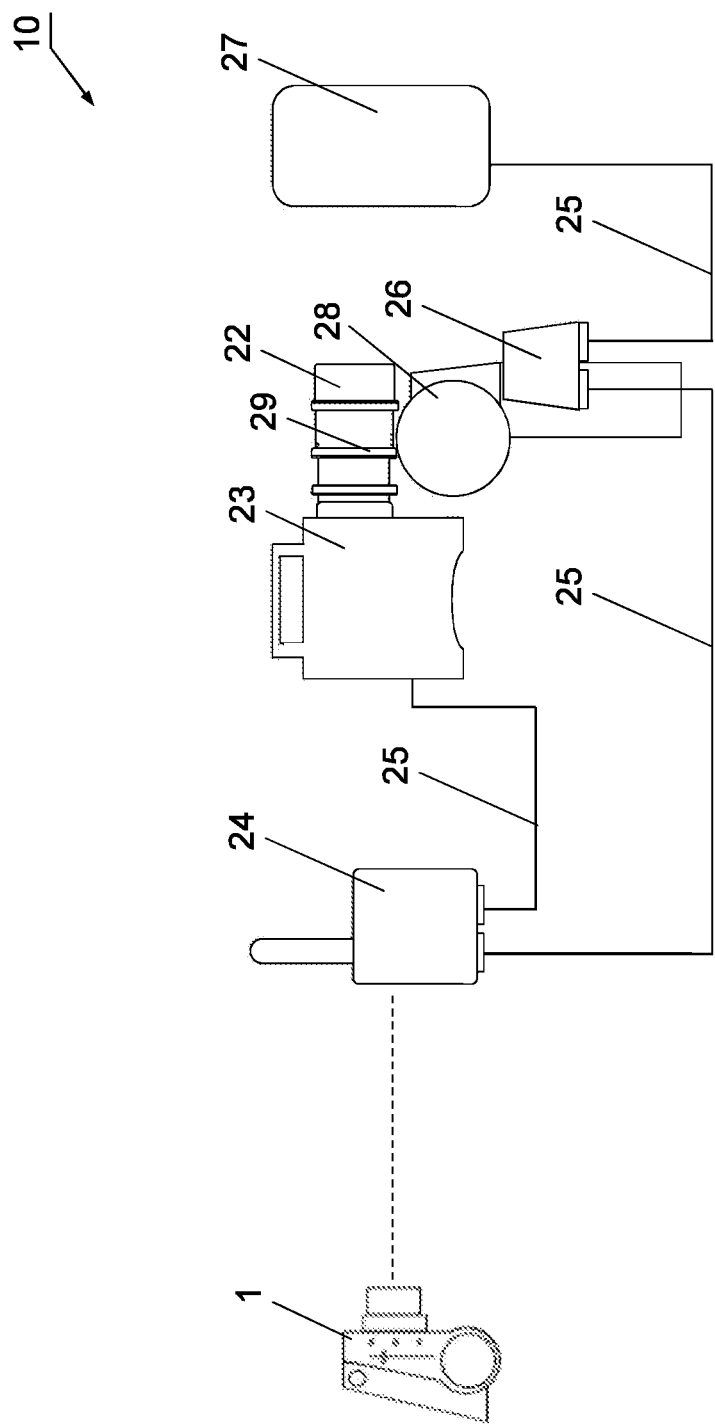

FIG. 6 in a schematic depiction an application example of the remote control according to the invention for the objective control of a film camera.

In the following there is made reference to the FIGS. 2 to 4, which depict an exemplary application example of a remote control 1 according to the invention in several views.

The remote control 1 has a grab handle unit 2, which may be received by a user (not depicted) in a first hand along a handle axis GA, and a first operating element 3 rotatable about a first axis of rotation DA1. The first operating element 3 may additionally have a pressure mechanism acting along the axis of rotation DA1, for example, in the form of an integrated mechanic pressure element. Using the first operating element 3, there may, for example, be controlled the zoom of an objective of a camera (not depicted).

The remote control 1 provides for the control of at least one element of a camera from the distance. Alternatively, one or several other elements, for example, an illumination or flash unit, and/or one or several functions, for example, the starting/stopping of the recording function, of a camera may be controlled from the distance.

The first axis of rotation DA1 is substantially perpendicular to a principal axis HA of the remote control 1 and spans with the principal axis HA a principal plane E. Herein, "substantially" means that the angle between the first axis of rotation DA1 and the principal axis HA may deviate, for example, due to production reasons, in a range of 90 angular degrees that is known to those skilled in the art and that may be expected.

The angle between the first axis of rotation DA1 and the principal axis HA may lie in a range between 89 and 91 angular degrees, wherein there is also possible a range of 85 to 85 angular degrees.

Figure 2:
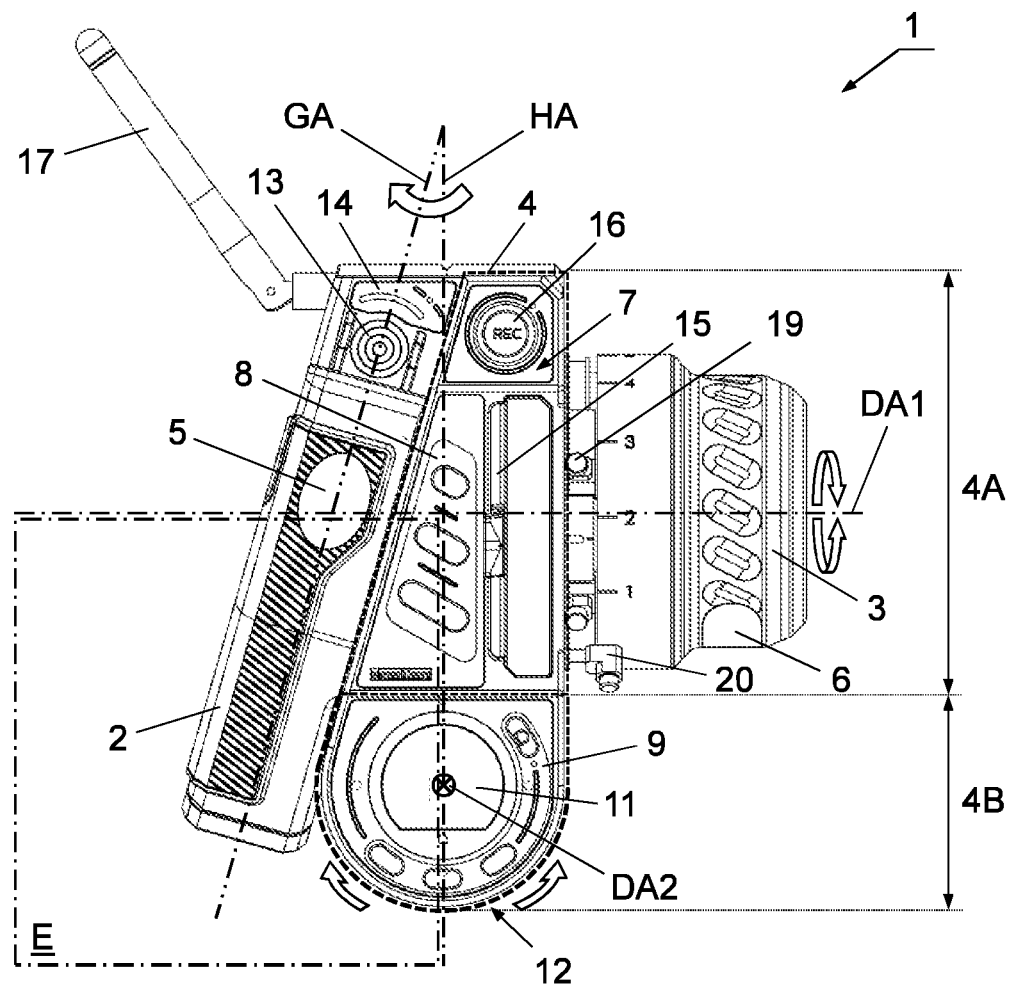
FIG. 2 shows in a top view an embodiment example of a remote control according to the invention for cameras.

In the depicted embodiment example of the remote control 1 according to the invention, the axis of rotation DA1, the principal axis HA and the handle axis GA lie within the principal plane E, wherein the handle axis GA in the principal plane E is rotated out of the principal axis HA, as symbolized in FIG. 2 by the respective arrow. Consequently, an angle between the handle axis GA and the first axis of rotation DA1 is higher than 90 angular degrees, wherein this angle may be in a range from about 91 to 180 angular degrees, preferably in a range of about 95 to 140 angular degrees, especially preferably in a range of about 100 to 120 angular degrees.

Figure 3:
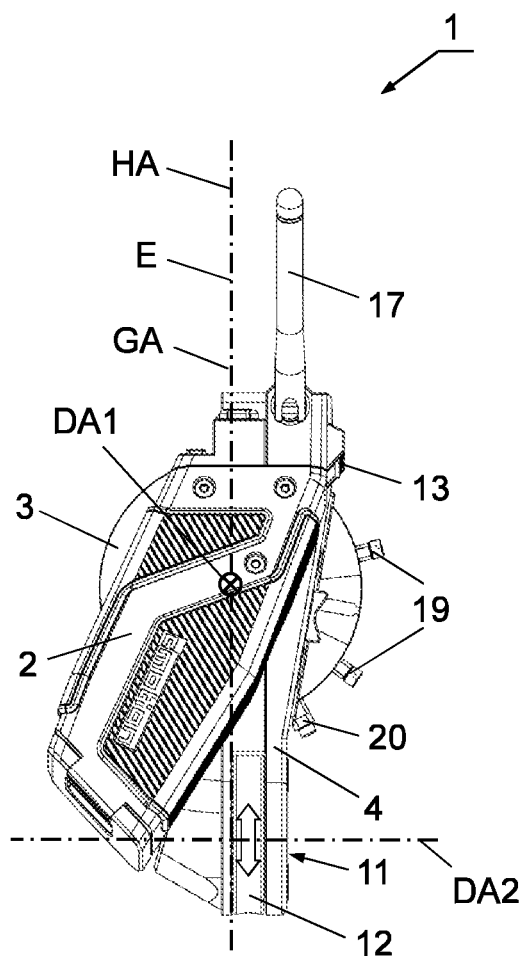
FIG. 3 shows in a side view from the left the remote control according to the invention of FIG. 2.
Figure 4:
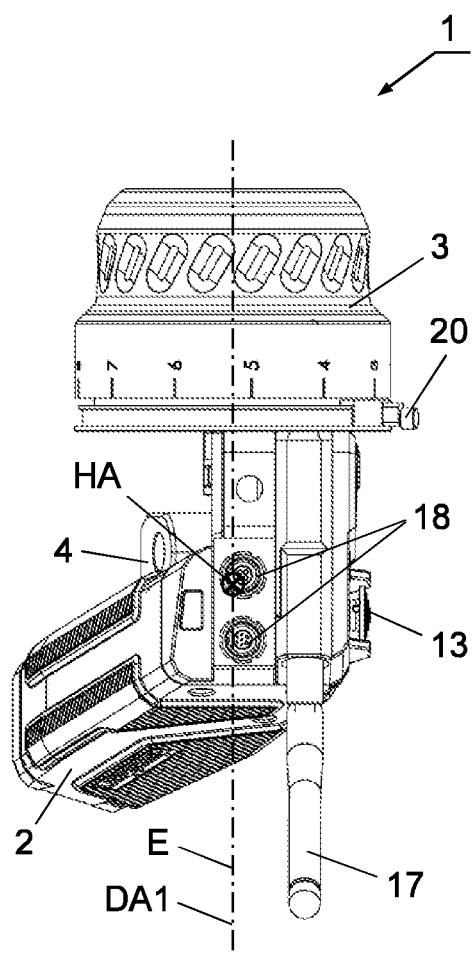
FIG. 4 shows in a front view the remote control according to the invention of FIG. 2.

If a user holds and/or operates an inventive remote control 1 according to the FIGS. 2 to 4 in a manner intended therefore and in an intended operational position, then the user encloses the grab handle unit 2 along the handle axis GA using a first hand, which would be the left hand according to FIG. 2, as the remote control 1 in FIG. 2 is depicted in the operational position from the top, this is, as viewed by the user, when he/she holds and/or operates the remote control 1 in the operational position. Using a second hand, which would be the right hand according to FIG. 2, the user may then hold and/or operate the first operating element 3, in particular rotate it about the first axis of rotation DA1 in both directions, clockwise or counter-clockwise, as symbolized in FIG. 2 by the respective arrows. The thumb of the user of the first, left, hand will then rest preferably in an area 5 on a top surface of the grab handle unit 2 and the thumb of the second, right, hand will preferably rest in a proximal area 6 of the first operating element 3. In the following description, the terms "proximal" and "distal" refer accordingly to the body of the user, if he/she holds and/or operates the remote control 1 in an operational position.

Figure 1:
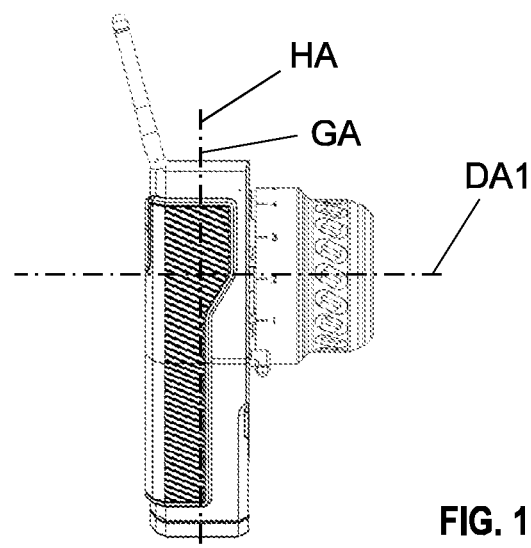
FIG. 1 shows in a top view a remote control for cameras known from prior art.

Due to the handle axis GA of the remote control 1 according to the invention being rotated out of the principal axis HA, in comparison to the remote control depicted in FIG. 1, there is present an additional area, in which there may advantageously be introduced an operating body 4. The operating body 4 may have a distal first portion 4A and a proximal second portion 4B.

In the exemplary embodiment according to FIG. 2 the first portion 4A has a trapezoid cross-section in parallel to the principal plane E and the second portion 4B has an at least partly semi-circular cross-section in parallel to the principal plane E, wherein the cross-section of the second portion 4B consists of a semi-circular proximal and a trapezoid distal sub-portion. Hereby, in particular the trapezoid portions of the operating body 4 are a consequence of the shape of the grab handle unit 2 and the first operating element 3. In this way, the additional area that is formed by rotating the handle axis GA thereout as well as the operating body 4 may assume any shape. This shape and the associated cross-sections depend, among others, on the shape of the grab handle unit 2 and of the first operating element 3 as well as on the direction and the angle, by means of which the handle axis GA is rotated out of the principal axis HA. For example, the grab handle unit 2 may be bent along the handle axis GA and/or it may have a concave and/or convex curved form and/or the handle axis GA may be rotated obliquely upwards/downwards out of the principal plane E and of the principal axis HA. In the present embodiment example according to FIG. 2, the grab handle unit 2 is in a proximal area bent downwards, in relation to the handle axis GA situated in the principal plane E.

The semi-circular portion of the operating body 4 has, among others, the advantage that the entire second portion 4B of the operating body 4 is well accessible and, hence, rapidly and intuitively operable. Furthermore, it does not have any corners or edges in its proximal peripheral area, thus reducing the risk of injuries.

The first portion 4A of the operating body 4 may have a second operating element 8 on the top surface 7. Alternatively or additionally, the second portion 4B of the operating body 4 may have a third operating element 9 on the top surface 7. The second operating element 8 and the third operating element 9 may have mechanic and/or electronic pressure elements. The pressure elements may be mechanic knobs or pressure-sensitive capacitive elements of a touch surface. Alternatively, there may be introduced slide controls and/or flush countersunk rotating disks. In addition, there may be introduced optical elements, in particular LEDs and/or OLEDs, and/or acoustic elements, in particular a loudspeaker and/or a microphone. Those skilled in the art may know possible further embodiments and alternatives.

Alternatively or additionally, the second portion 4B of the operating body 4 may have a round display 11. The display 11 may, for example, display items of information, optionally in real time, regarding the objective, the camera and/or the general system status. The round display 11 may have pressure-sensitive capacitive elements. The round display 11 may be a display on the basis of LED, E-ink or OLED. Those skilled in the art may know further possible embodiments and alternatives. If there is provided a round display 11, then the third operating element 9 may be arranged at least in some portions along the periphery of the display 11. This is especially space-saving and user friendly. The operating body 4 and/or the grab handle unit 2 and/or the first operating element 3 may have several displays.

If the operating body 4, as in the exemplary embodiment according to FIG. 2, has a semi-circular portion in the second portion 4B, then there may be provided a fourth operating element 12 along the semi-circular peripheral area of this portion rotatable about a second axis of rotation DA2. Using the fourth operating element 12, it is, for example, possible to navigate especially conveniently a menu of the remote control 1 and/or of the camera, wherein the items of information thereto may be displayed in the display 11. The second axis of rotation DA2 is substantially perpendicular to the principal plane E. "Substantially" herein means that the angle between the second axis of rotation DA2 and the principal plane E may deviate, for example, due to production reasons, in a range of 90 angular degrees that is known to those skilled in the art and that may be expected. For example, the angle between the second axis of rotation DA2 and the principal plane E may be 89 angular degrees or 91 angular degrees, wherein there is also possible a range of 85 to 85 angular degrees.

The grab handle unit 2 may have in an upper distal area a fifth operating element 13, in particular a joystick. Using the fifth operating element 13, the zoom of an objective of a camera may be controlled even more precisely, or in particular, automatically recognized elements or regions of shot picture may be selected. Display means 14, in particular LED or OLED elements, may thus be provided for the display of the current set-up or position(s) of the fifth operating element 13.

The operating body 4 may have, as depicted in FIG. 2, additional operating elements, such as, for example, a slide control 15, which may be provided for the set-up of the iris of the objective of the camera, and/or a mechanic push-button element 16, which may be provided for starting/stopping the recording of the camera. Furthermore, the remote control 1 may have an antenna 17 for the wireless data communication and/or slots 18 for receiving plugs for the cable-bound data communication, as depicted in FIG. 4.

The remote control 1 may be supplied with energy by means of a disposable battery and/or by means of a rechargeable battery, in particular an accumulator, which is, for example, situated in the grab handle unit 2 or the operating body 4. For the supply with energy, the remote control 1 advantageously has a releasable and/or fixedly installed capacitor, which is configured to ensure for a particular period of time also alone, this is, without the battery, a sufficient energy supply of the remote control 1. In this way, for example, there may be carried out a necessary replacement of an empty battery during operation, without the remote control 1 having to be switched off and/or the energy supply being disrupted inadvertently. The period of time, during which the capacitor alone will supply energy to the remote control 1, may range, for example, between ten (10) seconds and one (1) minute, preferably within about 20 seconds. A fixedly installed capacitor may, for example, be a so-called dual-layer capacitor, also called "gold cap".

If a user holds and/or operates the inventive remote control 1 according to the FIGS. 2 to 4 in an operational position, then he/she may operate, preferably using the thumb of the first, left hand, the second operating element 8, the fifth operating element 13 and/or the slide control 15, and he/she may, preferably using the thumb of the second, right, hand, the third operating element 9, optionally the display 11, the fourth operating element 12 and/or the push-button element 16. In this way, the remote control 1 according to the invention provides for a versatile, rapid and intuitive control of a camera, wherein remote control 1 may be held and/or operated in a compact, handy and ergonomic way.

The user may alternatively operate every operating element 3, 8, 9, 12, 13, 15, 16 and/or the display 11 using each finger and/or thumb of each hand or using an object, for example, a stylus.

Figure 5:
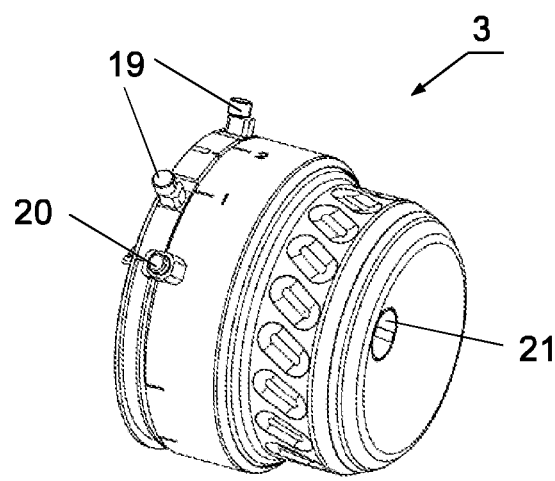
FIG. 5 shows in perspective view a first operating element of the remote control according to the invention of FIG. 2, configured as a rotary knob.

FIG. 5 shows the first operating element 3 according to the FIGS. 2 to 4 in an isolated perspective view. The first operating element 3 is configured as a rotary knob having an activatable and deactivatable rotation angle restriction. The rotation angle restriction consists of two terminal stops 19 and a stop 20 moving with the rotary knob. The terminal stops 19 may be fixed by means of screws or spring-loaded pins along the periphery of the rotary knob at a particular location. The stop 20 may also be fixed using a screw or a spring-loaded pin for locking the rotary knob. Using an activating means 21, which is configured as a screw as in FIG. 5, the rotation angle restriction may be activated or deactivated, for example, by the rotation angle restriction being decoupled from the rotary knob or coupled to the rotary knob, by way of the rotation of a screw. Thus in a first operational mode, in which the rotation angle restriction is activated, the rotary knob may be rotated in both rotational directions only up to the terminal stops 20, this is, by an angle smaller than 360 angular degrees. In a second operational mode, in which the rotation angle restriction is deactivated, the rotary knob may be rotated in both rotational directions for any period of time about an angle, which may also be higher than 360 angular degrees.

FIG. 6 shows a possible application example of the remote control 1 according to the invention as part of a system 10 for the objective control of an objective 22 of a film camera 23. The remote control 1 therein communicates in a wireless way, or alternatively in a cable-bound way, with an interface 24. The interface 24 in turn may be connected via cables 25, or alternatively without any cables, with the film camera 23 and/or with at least one motor 26. Each motor 26 may be electrically driven, for example by means of the energy from a battery 27, in order to drive, via a gear 28 of the motor 26, the gear 29 of the objective 22 ("daisy-chain" connection). Alternatively, the motor 26 may also directly have the interface 24. In this way, a user may control, for example, using the remote control 1, the focal point, iris and/or the zoom of the objective 22 and/or the starting/stopping of the recording of the film camera 23. The interface 24, the motor 26 and/or the battery 27 may be directly attached at the film camera 23.

The remote control 1 according to the invention thus provides independently or as part of a system the control of at least one function or of one element, for example, of the objective 22 and/or an illumination or flash unit, of a camera, for example, the film camera 23. The exemplary system 10 according to FIG. 6 may further have one or several interfaces 24 for the communication between the remote control 1 and the film camera 23 and/or between the remote control 1 and one or several other cameras and/or between the remote control 1 and elements, for example, the objective 22 and/or an illumination or flash unit, of the film camera 23 and/or of other cameras. The remote control 1 thus communicates, for example, via the antenna 17, in a wireless way, or alternatively in a cable-bound way, with the interface/s 24. The interface/s 24 in turn may then be connected via cables 25, or alternatively without cables, with the film camera 23/camera and/or with at least one motor 226. Preferably, the interface 24 is attached directly at the film camera 23, a camera and/or at the motor 26. In this way, a user may, for example, by means of the first operating element 3 and/or of another operating element 8, 9 or 12 of the remote control 1, may control one or several functions and/or elements.

A remote control 1 according to the invention may be provided alternatively to the control for any camera, for example, a photo camera or the camera of a smartphone, or in a system having such a camera. A remote control according to the invention may be provided for the control of a camera, which is attached at a land-, air- or water-bound, optionally unmanned or autonomous, vehicle, for example, a remote-controlled drone that may fly or a remote-controlled submarine, or in a system having such a camera and such a vehicle.

The invention claimed is:

1. A remote control for cameras, comprising:
   a grab handle unit configured to be received in a first hand by a user along a handle axis and
   a first operating element configured to be operable using a second hand of the user and rotatable about a first axis of rotation, wherein the first axis of rotation is substantially perpendicular to a principal axis of the remote control and spans a principal plane with the principal axis, wherein the handle axis is rotated out of the principal axis within the principal plane, such that an angle between handle axis and the first axis of rotation is higher than 90 angular degrees,
   an operating body with additional display means and/or operational elements within the area that is present due to the rotation of the handle axis thereout, wherein the grab handle unit and the first operational element are arranged in relation to each other such that while the user holds and/or operates the remote control in the operational position intended therefore, the thumb of the first hand rests on a top surface of the grab handle unit,
   wherein the operating body has a first portion and a second portion, wherein in the operational position of the remote control the first portion is located distal and the second portion is located proximal to the user,
   wherein the first portion of the operating body has a trapezoid cross-section in parallel to the principal plane and the second portion of the operating body has an at least partly semi-circular cross-section in parallel to the principal axis, and
   wherein the second portion of the operating body, along its semi-circular peripheral surface, has a fourth operating element rotatable about a second axis of rotation, wherein the second axis of rotation is substantially perpendicular to the principal plane.

2. A remote control according to claim 1, wherein the first portion of the operating body has on a top surface a second operating element, with mechanic and/or electronic pressure elements for a thumb of the first hand of the user.

3. A remote control according to claim 1, wherein the second portion of the operating body has a round display.

4. A remote control according to claim 1, wherein the second portion of the operating body on the top surface has a third operational element, with mechanic and/or electronic pressure elements for a thumb of the second hand of the user.

5. A remote control according to claim 4, wherein the third operating element is arranged at least in some portions along the periphery of the display.

6. A remote control according to claim 1, wherein the grab handle unit in an upper distal area has a fifth operating element configured to be operated using a thumb of the first hand of the user.

7. The remote control according to claim 6, wherein the fifth operating element comprises a joystick.

8. A remote control according to claim 1, wherein the first operating element is configured as a rotary knob having an activatable and deactivatable rotation angle restriction.

9. A remote control according to claim 1, wherein the remote control has a battery and a capacitor for the energy supply, wherein the capacitor is configured to ensure for a determined period of time a sufficient energy supply of the remote control.

10. The remote control according to claim 9, wherein the determined period of time is during replacement of the battery.

11. A system for the remotely controlling a function or an element or an objective of a film camera of the system, wherein the system comprises a remote control according to claim 1, which is configured by means of an operating element to control the function or the element or the objective of the film camera.

12. A system according to claim 11, wherein the system includes an interface for communication between the remote control and the film camera, wherein the interface is attached at the film camera, wherein the remote control is configured for wireless communication with the interface.

\* \* \* \* \*